3,666,352
RATE CONTROLLED PHOTOCHROMIC LENSES OF VINYL CHLORIDE-VINYL ACETATE COPOLYMER CONTAINING A MERCURY THIOCARBAZONE COMPOUND
Charles A. Wagner, Towson, Md. (32 Virginia Ave., Shrewsbury, Pa. 17361), and Herman B. Wagner, Triangle Hill, Box 22, R.D. 1, Perkasie, Pa. 18944
No Drawing. Continuation-in-part of application Ser. No. 474,956, July 26, 1965. This application Jan. 22, 1970, Ser. No. 5,095
Int. Cl. G02c 7/10; G02b 5/20; F21v 9/00
U.S. Cl. 350—160
8 Claims

ABSTRACT OF THE DISCLOSURE

Mercury thiocarbazone compounds dispersed in a solidified plasticized resin composition consisting essentially of vinyl chloride copolymerized with, e.g., not less than 5 mol percent of vinyl acetate and laminated in a sandwich between two transparent glass or plastic layers provide lenses with extremely rapid color responses to incident light and reversion to dark-adapted states.

CROSS-REFERENCE TO RELATED APPLICATION

This application is a continuation-in-part of copending application Ser. No. 474,956, filed July 26, 1965, now abandoned.

This invention relates to certain photochromic compositions and devices, providing for regulated speed and mode of response to light, and of recovery from the effects of such irradiation.

BACKGROUND OF THE INVENTION

Certain substances have phototropic characteristics and change in color or in degree of light transmission as a result of exposure to light. Among the relatively large number of phototropic substances, however, only a small number possess the property of reversibly responding to irradiation and assuming a steady state of light transmittance that is dependent on the intensity of the incident radiation. While some of these substances are stable under practical conditions and are capable of undergoing a large number of repeated cycles of color change by irradiation with subsequent complete reversion to initial color, none of them, as far as is now known, when dispersed in solid transparent compositions, will rapidly respond and revert at ambient temperatures.

It will be apparent, if transparent, photochromic solids satisfying the rigid requirement of rapid response, i.e., of the order of 100 seconds or less at ambient temperatures, i.e., 65–90° F., could be provided, they would satisfy a number of useful applications. For example, the sandwiching of such solids between transparent layers will provide photochromic lenses for sunglasses, and cameras, as well as light filters for cameras and the like, windows and sun visors and shades.

It has been proposed to disperse mercury thiocarbazone photochromic compounds in plasticized vinyl chloride resins for coating toys, e.g., dolls, which mimic a sunburned effect when exposed to sunlight. Such coatings serve admirably the purpose simulating over three to four minutes in strong sunlight the darkening observed with the human skin and gradually reverting over eight to ten minutes to a lighter color when shielded from the light. Unfortunately, such gradual changes are not useful for efficient sunglasses—consider, for example, the need for rapid response in driving an automobile into a highway tunnel. Consider also the need quickly to adjust a camera to obtain a satisfactory exposure when a cloud passes overhead.

It has also been proposed to disperse mercury thiocarbazone photochromic compounds in solid, unplasticized resins, such as polystyrene, cellulose acetate and the like. These require 10 to 60 minutes for color development and reversion at ambient temperatures. It is only by heating at about 180° F. that the time can be shortened, and this expedient, which is impractical in any event for sunglass lenses and camera light filters, cuts the reversion time only to 5 minutes or more.

It has now surprisingly been found that if mercury thiocarbazone compounds are used with a particular polymer, plasticized with a particular amount of plasticizer, lenses and filters with remarkably rapid response and reversion will be obtained.

A primary object of this invention is to provide photochromic lenses for sunglasses, these having a very much more rapid adjustment to incident light intensity than heretofore accomplished.

Another object of this invention is to provide photochromic sunglass lenses having substantially increased durability toward photo-chemical degradation.

A further object of this invention is to provide automatic light filters for camera lenses, these compositions and constructions providing for simple and very rapid response and adjustment to the light intensity reflected from the photographed subject.

DESCRIPTION OF THE INVENTION

These objects and all others readily apparent to those skilled in the art are secured according to this invention with photochromic lenses exhibiting rapid color response and adjustments to incident light comprising a pair of adjacent transparent layers having interposed between them an intermediate layer of a mercury thiocarbazone compound admixed with a vinyl chloride-vinyl acetate copolymer resin and a plasticizer, with which the resin is capable of fusing at a temperature of below 120° C., there being from about 1.0 to 10 parts by weight of plasticizer per part of resin and the quantity of mercury thiocarbazone compound ranging from about 0.01 to about 0.10 milligram per square centimeter of lens area, the amount of plasticizer and quantity of mercury compound being selected to achieve complete color response and adjustment in less than 100 seconds.

The present invention also contemplates a method of producing such lenses. Also contemplated is an improvement in the method which increases durability of the substances which comprises applying over the mercury thiocarbazone layer a protective compound to screen out light of ultraviolet wavelengths.

The mercury thiocarbazones contemplated to be used in this invention are of the formula:

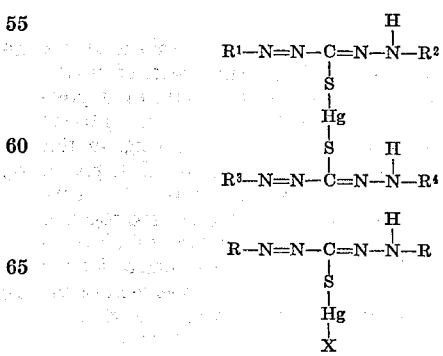

wherein $R^1$, $R^2$, $R^3$ ad $R^4$ are the same or different and are aryl groups, R is an aryl group and X is a halogen atom, an alkyl group or an aryl group. The two groups R in the second formula need not be the same. The compounds can be made, for example, as described by Wobling and Steiger, Z. angew. Chem. 46, 279 (1933). Especially useful mercury thiocarbazones are mercury bis-diphenyl thiocarbazone, monodiphenylthiocarbazone mercuric chloride, fluoride, iodide or bromide; monodinaphthylthiocarbazone mercuric chloride, fluoride, iodide or bromide; monoditolylthiocarbazone mercuric chloride, fluoride, iodide or bromide, mercury bis-dinaphthylthiocarbazone, mercury ditolylthiocarbazone, ethyl mercuric diphenylthiocarbazone and phenyl mercuric diphenylthiocarbazone.

The resin is a vinyl chloride-vinyl acetate copolymer, of a type which is freely available commercially. The resin can be made by copolymerizing vinyl chloride and vinyl acetate together, in known ways. Polymerization can be, for example, by suspension, emulsion, bulk or solution methods. The molecular weight can vary fairly widely without affecting the results. The amount of vinyl acetate co-monomer can vary over a wide range, e.g., from about 1 to about 99 mol percent, but best results in terms of rapid response and reversion, will be obtained if the resin contains not substantially less than about 5 mol percent of copolymerized vinyl acetate. The upper limit of vinyl acetate content is not critical. Surprisingly, as will be shown hereinafter, vinyl chloride homopolymers are not suitable in the present invention because of slow reversion time, but only a minor amount of vinyl acetate is sufficient to effect a remarkable change in the rate of color change in the lenses. For example, 9–10 mol percent of copolymerized vinyl acetate causes almost a nine-fold reduction in response time in comparison with a vinyl chloride homopolymer.

The plasticizers also are freely available commercially or easily prepared by known ways. The only requirements are that they be non-reactive with the photochromic compounds and that they fuse with the resin at a temperature below about 120° C. Illustrative plasticizers are high molecular weight esters, such as abietates, adipates, abelates, benzoates, biphenyls, citrates, fumarates, glycerol esters, glycol esters, isophthalates, maleates, laurates, phosphates, phthalates, ricinoleates, sebacates, succinates, and the like. Special mention is made of di-(2-ethylhexyl) phthalate, diisodecyl phthalate, ditridecyl phthalate, dicapryl phthalate, dibutyl phthalate, di(2-ethylhexyl) adipate, diisodecyl adepate, di(n-octyl n-decyl) adipate, dihexyl azelate, di(2-ethylhexyl) azelate, diisooctyl azelate, dihexyl azelate, dioctyl sebacate, tricresyl phosphate, and the like. Functional groups toward which the photochromic compounds are not stable, should not be present in the plasticizer, resin or other components of this invention. Examples of such undesirable substituents are nitro, hydroxyl and reactive amine groups.

DESCRIPTION OF THE PREFERRED EMBODIMENTS

The invention is illustrated in the following examples.

Example 1

One weight part of mercury bis-diphenyl thiocarbazone is dissolved in twenty-five hundred weight parts of dibutyl phthalate. Twenty-five hundred weight parts of a powdered copolymer of vinyl chloride and 9–10 mol percent of vinyl acetate are then dispersed, by mixing, in this solution. Three drops of this dispersion are then placed between two thin circular, colorless glass discs, 1.5 centimeters in diameter. These discs are then pressed together so as to produce a liquid layer approximately 0.10 centimeter in thickness. This assembly is then heated, for ten minutes, in an oven at 110° C., so that conversion of the liquid interlayer to a transparent, solid form is effected. Specifications given above provide a concentration of the photochromic thiocarbazone compound of approximately 0.02 milligram per square centimeter. In general, relative proportions of the photochromic compound to the other components of the liquid are varied inversely as the thickness of the liquid interlayer.

The light filter, described above, is mounted over an eight-millimeter movie camera lens, and used to photograph subjects under various intensities of illumination. In the instance here cited an unadjusted "$f$-stop" of value 4 is maintained constant throughout, so that all regulation of the light admitted to the camera chamber is accomplished by the light filter.

The subjects photographed range in reflected light intensity from about 40 to 200 lumens. If these are to be properly photographed, without the photochromic light filter above described, an "$f$-stop" manual adjustment of value ranging from 5 to 11 will be required. With the photochromic filter, of the type above described, no such manual adjustment is needed, and satisfactory exposure is obtained.

In the table following there is shown the percent light transmission (at 6000 A.) when this filter has reached a steady state of equilibration to surrounding light of varying intensity. The data indicate the manner in which the filter compensates its transmittance to the incident light intensity received from the photographed subject.

TABLE 1

| Light percent of incident: | Light reflected from subject |
|---|---|
| 62 | 0 |
| 40 | 100 |
| 26 | 200 |
| 22 | 300 |
| 17 | 500 |
| 14 | 700 |
| 12 | 1000 |

Example 2

A higher molecular weight, powdered vinyl chloride homopolymer resin is used in place of the vinyl chloride-vinyl acetate copolymer of Example 1. With a heating temperature of 110° C., a translucent but not transparent filter is obtained. When the baking temperature is increased by 50° C. a transparent solid is obtained, but photochromic properties are lost.

In general, a heating temperature not exceeding 120° C. has to be used in preparing the photochromic filters. Other plasticizers, such as those mentioned above, and especially dioctyl phthalate, di(2-ethylhexyl)phthalate, and dioctyl sebacate may be used in place of dibutyl phthalate; however, a plasticizer "fusing," i.e., forming a homogeneous mixture, with the copolymer resin at a temperature below 120° C. is required.

Example 3

Phenyl mercuric diphenylthiocarbazone is used in place of the mercury bis-diphenylthiocarbazone of Example 1, to produce a camera lens light filter, the other ingredients and construction being the same. This produces a light filter showing reduced red tone in subjects photographed at low intensities of incident light.

Other mercury thiocarbazone compounds that can be used for this purpose are mentioned above and include, for example, mono diphenylthiocarbazone mercuric fluoride, iodide, bromide, or chloride, mercury bis-dinaphthyl thiocarbazone, mercury bis ditolylthiocarbazone, ethyl mercuric diphenylthiocarbazone. Depending upon the "speed" on the film and the exposure time for each frame, the concentration of the photochromic thiocarbazone compound may range from about 0.01 to 0.10 milligram per square centimeter of filter area.

Example 4

The above compositions are also used as the interlayer between glass layers of larger area, these matched to each other, to provide sunglass lenses. Clear plastic sheets of cellulose acetate butyrate, and of polymethyl methacrylate are also used, in place of the glass layers, in constructing both the camera lens filters and the sunglass lenses above described. These compositions and constructions provide for very rapid adjustment of color, to suit the intensity of light in the wearer's or photographer's environment.

A principal advantage of these compositions is the unusually rapid response when the filter or lenses is taken from a brightly illuminated area to a darker area. With these only 8 to 100 seconds is required for substantially complete transition to the dark-adapted color. Even shorter times are required for adaptation to intermediate light intensities. This characteristic, not heretofore accomplished, is necessary if suitably rapid readjustment of the camera lens filter or sunglass lens is to take place, in moving from a bright to a darker area. With typical, present compositions, utilizing polymers such as polystyrene or cellulose acetate, 10 to 60 minutes is required for comparable color transition. The only way known to obtain shorter times is to heat such compositions to about 180° F. or so.

Example 5

A direct comparison of vinyl chloride resin and a vinyl chloride-vinyl acetate copolymer resin is made. The latter resin is contemplated to be a component of the lenses of the present invention.

A mixture of 10 parts by weight of a high molecular weight vinyl chloride resin and 15 parts by weight of dibutyl phthalate plasticizer is prepared, the plasticizer also containing 0.006 part by weight of mercury bis-diphenylthiocarbazone. After insuring that a homogeneous dispersion is formed, a portion of the fluid dispersion is poured as a thin layer of 0.05 cm. thickness between two blass plates and the sandwich is heated for 30 minutes in an oven at 110° C. A translucent solid film is obtained having a color slightly off from orange-red. A portion of the specimen is exposed for 120 seconds at 30 cm. distance from the face of a GE-RS sunlamp thereby causing an immediate darkening of the irradiated area and showing also a substantial contrast in color between the irradiated area and the non-irradiated area. The period is measured for the color of the irradiated area to revert back to the color of the non-irradiated area. The time required is 105 seconds.

The same procedure is followed again, but instead of using the vinyl chloride polymer there is used a high molecular weight vinyl chloride-vinyl acetate (9–10 mol percent vinyl acetate) copolymer resin. Again after preparation of the sandwich heated as above, the sandwich lens is exposed for 120 seconds at 30 cm. from the face of a GE-RS sunlamp causing immediate darkening of the irradiated area. The period is again measured for the irradiated area to revert back to the color of the non-irradiated area. This period of time is only 12 seconds.

As a result of the foregoing, it is demonstrated that the use of the vinyl chloride-vinyl acetate copolymer yields almost a ninefold improvement in speed of reversion following exposure as compared to vinyl chloride polymers similarly treated.

Example 6

The effect of plasticizer to polymer ratio on reversion time is determined as follows:

Following the procedure of Example 5, there is prepared a series of mixtures of the same vinyl chloride-vinyl acetate copolymer resin with varying amounts of plasticizer and containing in each case 0.006 part by weight of mercury bis-diphenylthiocarbazone. In each case lens sandwiches are prepared and exposed to radiation from the sunlamp. The ratio of plasticizer-polymer each being expressed in parts by weight and the reversion time following irradiation is set out below in each case. In the one instance when no plasticizer is used, the film is prepared by dissolving the resin and the mercury compound in methyl isobutyl ketone as a solvent, spreading the solution on a glass plate, thoroughly drying off the solvent to leave the polymer film mixed with the mercury compound and then covering with a single glass plate. The results obtained are as follows:

| Plasticizer/polymer ratio: | Reversion time (seconds) |
|---|---|
| 0 | 1550 |
| 1.0 | 15 |
| 1.5 | 12 |
| 2.0 | 9 |
| 3.5 | 8 |
| 5.0 | 8 |
| 10.0 | 8 |

The foregoing reveals that in the absence of a plasticizer complete reversion takes over 25 minutes whereas with equal parts by weight of plasticizer and polymer, reversion is complete in 15 seconds, an increase in effectiveness due solely to the plasticizer of some one hundredfold.

Example 7

The procedure of Example 6 is repeated, but using light transmission at 6000 A. for the purpose of obtaining a more quantitative comparison of the reversion rates and computing the rate constants for reversion for each of the systems. The reversion reaction is found to be a second order reaction and on that basis the following rate constants are found for each of the plasticizer/polymer ratios:

| Plasticizer/polymer ratio: | Relative rate constant for reversion (20° C.) |
|---|---|
| 0 | 15 |
| 1.0 | 1.4 |
| 1.5 | 1.2 |
| 2.0 | 1.1 |
| 3.5 | 1.0 |
| 5.0 | 1.0 |
| 10.0 | 1.0 |

As has been demonstrated, by varying the ratio of plasticizer to vinyl resin from 10 to 1 to 1.0 to 1 the rate of adjustment can be controlled, higher plasticizer ratios giving more rapid rates of adjustment. Additionally, volatile solvent diluents, such as methyl isobutyl ketone or ethyl acetate, may be incorporated along with the plasticizer, where increased fluidity is desired, provided that these are allowed to escape by evaporation before the baking step to form the laminate is begun.

An additional requirement, for such filters and lenses, is that they be durable, in the sense that repeated exposure to light will not cause loss of their basic color characteristics. It has been found that, by employing certain compounds with a selective, high degree of adsorption for radiation lower than about 4200 angstrom units in wavelength, and a low degree of adsorption above 4200 angstrom units that (a) the photochromic response is still obtained (b) the durability of the photochromic substances is substantially increased and (c) color quality of the photochromic devices is not distorted.

Example 8

A 1/32" thick section of cellulose acetate sheet is coated by dipping into a solution having the following composition:

| | Weight parts |
|---|---|
| "1/2 second" cellulose acetate butyrate polymer | 15 |
| Toluene | 77.5 |
| Ethyl alcohol | 4.4 |
| n-Butyl alcohol | 3.0 |
| Mercury bis-diphenyl thiocarbazone | 0.075 |

After air-drying, to permit evaporation of the solvent components, a photochromic film, of about 0.002" thickness has been deposited over the cellulose acetate sheet.

This coated sheet is then dipped into a second solution consisting of:

| | Weight parts |
|---|---|
| "½ second" cellulose acetate butyrate polymer | 15 |
| Toluene | 50 |
| Ethyl alcohol | 34.6 |
| 2,2'-dihydroxy-4-methoxybenzophenone | 0.4 |

Upon drying an approximately 0.003″ thick coating, containing the benzophenone screening compound is obtained over the photochromic layer. The durability of this system, as determined upon prolonged exposure to direct sunlight, is 2 to 3 times as great as that of the unprotected (first coating only) control, and photochromic activity is not inhibited. The second solution can also be used to protect transparent solid interlayers prepared according to the procedure of Example 1.

Other suitable compounds that can be effectively used in place of the 2,2'-dihydroxy-4-methoxybenzophenone are 2,4 - dihydroxybenzophenone, ortho-hydroxyphenylbenzotriazoles, and substituted acrylonitriles. It has been found also that, as an alternative approach to increasing durability, the screening agent can be incorporated directly in the photochromic layer, and thus only one coating, containing together both the photochromic substance and the screening agent needs to be made. However, for comparable weights of screening agent, the protective effect is not as great when employed in this latter manner. In general about 0.05 to 0.60 milligram of screening compound per square centimeter of area is required.

There have thus been described certain improved photochromic compositions, and novel constructions, these providing regulated rate of adjustment to light intensity. There have been described also compositions and methods for increasing the durability, and thereby the useful life of these and other photochromic devices. There have further been described novel methods for using such compositions.

We claim:

1. A photochromic lens exhibiting rapid color response and adjustments to incident light comprising a pair of adjacent transparent layers having interposed between them an intermediate layer of a mercury thiocarbazone compound admixed with a vinyl chloride-vinyl acetate copolymer resin containing about 5–10 mol percent of vinyl acetate and a plasticizers, with which said resin is capable of fusing at a temperature of below 120° C., there being from about 1.0 to 10 parts by weight of plasticizer per part of resin and the quantity of mercury thiocarbazone compound ranging from about 0.01 to about 0.10 milligram per square centimeter of lens area, the amount of plasticizer and the quantity of mercury compound being selected to achieve complete color response and adjustment in less than 100 seconds.

2. A photochromic lens as defined in claim 1 wherein said plasticizer is selected from the group consisting of dibutyl phthalate, dioctyl phthalate, di(2-ethylhexyl) phthalate and dioctyl sebacate.

3. A photochromic lens as defined in claim 1 wherein there is about one part by weight of resin per part of plasticizer.

4. A photochromic lens as defined in claim 1 wherein said mercury thiocarbazone compound is selected from the group consisting of monodiphenylthiocarbazone mercuric chloride, fluoride, iodide or bromide; monodinaphthyl thiocarbazone mercuric chloride, fluoride, iodide or bromide; monoditolylthiocarbazone mercuric chloride, fluoride, iodide or bromide; mercury bis-diphenylthiocarbazone, mercury bis-dinaphthylthiocarbazone, mercury bis-ditolylthiocarbazone, ethyl mercuric diphenylthiocarbazone, or phenyl mercuric diphenylthiocarbazone.

5. A photochromic lens as defined in claim 1 wherein the pair of transparent layers are each glass layers.

6. A photochromic lens as defined in claim 1 wherein the pair of transparent layers are each transparent plastic layers.

7. A photochromic lens exhibiting rapid color response and adjustment to incident light comprising a pair of adjacent transparent layers having interposed between them an intermediate layer of a mercury thiocarbazone compound admixed with a vinyl chloride-vinyl acetate copolymer resin containing about 9–10 mol percent of copolymerized vinyl acetate and a plasticizer, with which said resin is capable of fusing at a temperature below 120° C., there being from about 1.0 to 10 parts by weight of plasticizer per part by weight of resin and the quantity of mercury thiocarbazone compound ranging from about 0.01 to about 0.10 milligram per square centimeter of lens area, the amount of plasticizer and the quantity of mercury compound being selected to achieve complete color response and adjustment in less than 100 seconds.

8. A photochromic lens as defined in claim 1 also including between said adjacent transparent layers a protective compound essentially transparent to radiation of wavelength greater than 4200 angstrom units and essentially opaque to radiation of wavelength smaller than 4200 angstrom units, said protective compound being selected from the group consisting of benzophenones, benzotriazoles and substituted acrylonitriles.

References Cited
UNITED STATES PATENTS

| | | | |
|---|---|---|---|
| 3,215,530 | 11/1965 | Riebel et al. | 96—48 |
| 3,212,898 | 10/1965 | Cerreta | 96—90 PC |
| 3,134,674 | 5/1964 | Brown | 96—68 |
| 3,105,761 | 10/1963 | Forie | 96—27 |
| 2,921,407 | 1/1960 | Wagner et al. | 252—300 |
| 2,160,907 | 6/1939 | Richardson | 95—2 |

FOREIGN PATENTS

| | | | |
|---|---|---|---|
| 1,165,411 | 3/1964 | Germany | 96—90 PC |
| 1,010,234 | 11/1965 | Great Britain | 96—90 PC |
| 1,269,822 | 1961 | France | 88—106 P |

GEORGE F. LESMES, Primary Examiner

J. P. BRAMMER, Assistant Examiner

U.S. Cl. X.R.

96—90 PC; 252—300